United States Patent [19]
Shin et al.

[11] 3,834,719
[45] Sept. 10, 1974

[54] PISTON HEAD ASSEMBLY HAVING AN L-SHAPED PISTON RING

[75] Inventors: Keichiro Shin, Ageo; Mikio Miyamoto, Ohmiya, both of Japan

[73] Assignee: Nippon Piston Ring Co., Ltd., Tokyo, Japan

[22] Filed: Oct. 27, 1971

[21] Appl. No.: 193,123

[30] Foreign Application Priority Data
Oct. 27, 1970 Japan............................. 45-106043
Oct. 27, 1970 Japan............................. 45-106044

[52] U.S. Cl..................... 277/170, 277/173, 92/182
[51] Int. Cl........................... F16j 9/20, F01b 31/10
[58] Field of Search.......... 277/170, 171, 172, 173, 277/178; 92/182, 181

[56] References Cited
UNITED STATES PATENTS

| | | | |
|---|---|---|---|
| 2,186,020 | 1/1940 | Hall | 277/171 |
| 2,566,603 | 9/1951 | Dykes | 277/173 |
| 3,291,497 | 12/1966 | Cross | 277/171 |
| 3,554,564 | 1/1971 | Lassanke | 277/170 |

*Primary Examiner*—Samuel B. Rothberg
*Attorney, Agent, or Firm*—Sughrue, Rothwell, Mion, Zinn & Macpeak

[57] ABSTRACT

A piston head assembly having an annular groove carries a substantially L-shaped cross-sectional ring. One side of the ring has a wear surface, while the other faces of the ring are slanted to provide gas access to the rear of the ring. The annular groove has matching faces whereby sticking and excessive wear is reduced.

3 Claims, 6 Drawing Figures

PISTON HEAD ASSEMBLY HAVING AN L-SHAPED PISTON RING

BACKGROUND OF THE INVENTION

Field of the Invention

This invention provides a piston head assembly equipped with a piston ring which has a nearly L-shaped cross section, capable of suppressing the exhaust of the detrimental automobile waste gas and also increasing the power of the engine.

The piston ring of this invention has a nearly L-shaped cross section composed of a wedge shaped lateral portion and a vertical portion rear face which may be upright or inclined to form a triangular space between the piston head and the rear face of the piston ring.

This piston ring, when applied to a ring groove of a piston head having a similar wedge shaped cross section, brings out a favorable gas sealing effect, maintains the full power of the cylinder and prevents any sticking of the piston ring to the piston head.

This invention relates to a piston head assembly equipped with a piston ring having a nearly L-shaped cross section, and more particularly to an improved structure of this piston ring.

In recent years, the pollution of air due to automobile exhaust gas has given rise to much public discussion and a means to solve the problem of air pollution has been expected. The piston ring was already proposed to solve this problem and to increase the power of the automobile engine. The conventional piston or headland ring, however, could not fully perform this function due to its structural defects.

Therefore, this invention provides an improved structure of the headland ring capable of exhibiting fully its functions and also a piston head assembly equipped with this headland ring.

BRIEF DESCRIPTION OF THE DRAWINGS

Now more detailed embodiment of this invention will be described with reference to accompanying drawings, wherein.

DESCRIPTION OF THE PREFERRED EMBODIMENT

Figure 1:
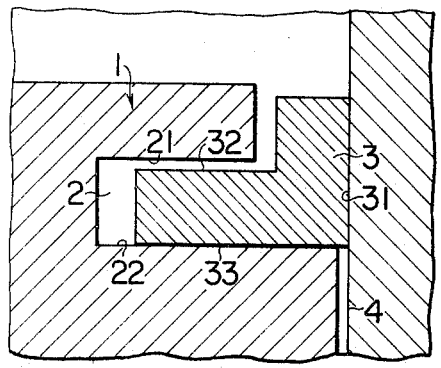
FIG. 1 shows a cross sectional side view of a part of the conventional headland ring inserted into a ring groove of the piston head having the L-shaped cross section.

The conventional headland ring 3, shown in the FIG. 1, having a nearly L-shaped cross section was inserted into a ring groove 2 of a piston head 1. Thus, the pressure of the combustion gas was effectively applied to the headland ring 3 to thrust a sliding face 31 of the latter to an inner face 4 of the cylinder, to prevent effectively the blow-by of the combustion gas, to reduce the CO content in the exhaust gas and to increase the power of the cylinder. The conventional headland ring, however, was apt to be stuck to the piston head since the headland ring was located at the periphery of the piston head, whereby the functions of the headland ring were much diminished. Besides, since the pressure of the combustion gas was not fully utilized by the structure of the conventional headland ring, both the stopping of the exhaust gas and the performance of the cylinder could not be fully realized.

In order to eliminate the aforesaid structural defects of the conventional headland ring, this invention provides various types of improved headland or piston rings as shown in the FIGS. 2-6.

Figure 2:
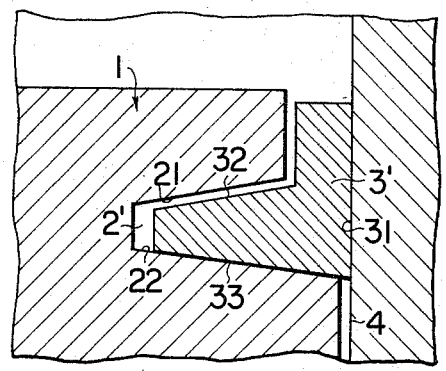
FIGS. 2-6 show the same views as in FIG. 1 for the L-shaped headland rings according to this invention.
Figure 3:
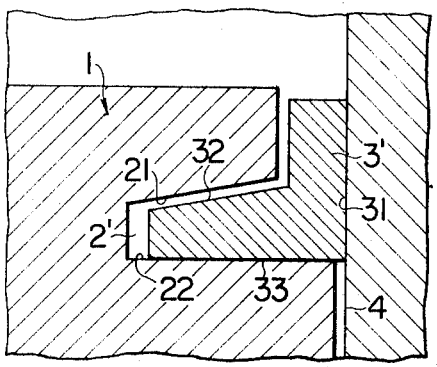

Referring to FIG. 2, the headland ring 3' has a nearly L-shaped cross section composed of a vertical portion and a horizontal portion. Both an upper face 32 and a lower face 33 of the horizontal portion are slanted from the horizontal plane. This headland ring 3' is inserted into a ring groove 2' of the piston head 1; the ring groove 2' has an upper face 21 and a lower face 22, and both faces are slanted correspondingly to the slanted faces 32 and 33 of the headland ring 3', respectively. As the horizontal portion of the headland ring 3' is shaped as a wedge, carbonaceous residues accumulated between the upper face 21 of the ring groove 2' and the upper face 32 of the headland ring 3' are thereby crushed, and therefore, the sticking of the headland ring 3' to the ring groove 2' is prevented. Another headland ring 3', shown in the FIG. 3, having the slanted upper face 32 and the flat lower face 33 is equally effective to prevent the sticking of the headland ring to the ring groove of the piston head 1.

Figure 4:
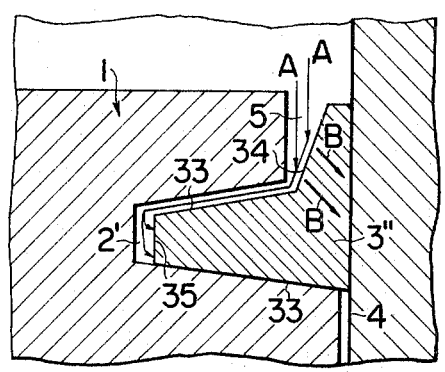
Figure 5:
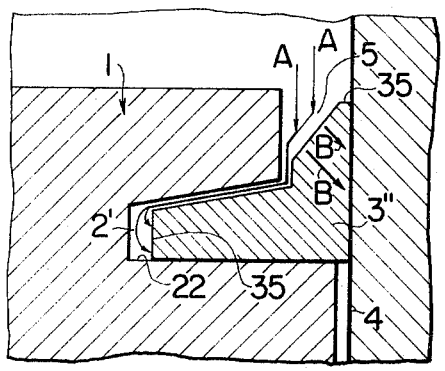
Figure 6:
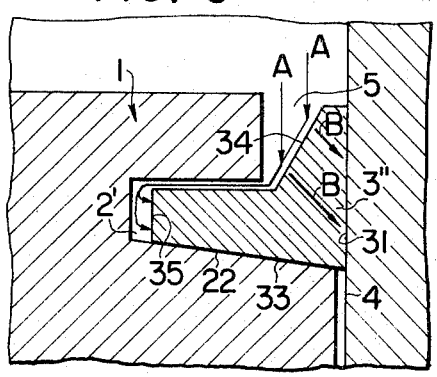

Referring to FIG. 4, the headland ring 3'' has a nearly L-shaped cross section composed of the horizontal wedge portion and the vertical portion rear face 34 of which is inclined to form a triangular space 5 between the upper peripheral face of the piston head 1 and the inclined rear face 34 of the headland ring 3''. This triangular space is also formed between the upper peripheral face of the piston head and the headland ring for the piston head assembly shown in FIG. 6, which has the flat upper face 32 and the lower slanted face 33 of the lateral wedge portion. The rear face of the vertical portion may be composed of a lower upright face and an upper inclined face as shown in FIG. 5. The triangular space 5 can be formed by the headland ring as noted in FIGS. 4, 5 or 6, and the combustion gas is introduced into the triangular space 5 and the aperture between the ring groove of the piston head and the wedge shaped lateral portion of the headland ring, whereby the latter is thrusted against the inner face 4 of the cylinder and the lower face 22 of the ring groove in the piston head as illustrated by arrow marks A and B. This produces the favorable sealing effect of the headland ring, and prevents the sticking of the headland ring to the piston head.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. In a piston head assembly for reciprocation within a combustion cylinder and wherein said piston head is provided with an annular peripheral groove of L-shaped cross section at the top of said head and defining an upper peripheral portion offset radially inward from the balance of the piston periphery and wherein a sealing wear ring of generally L-shaped cross section formed of a generally horizontal portion and a generally vertical portion is correspondingly carried within said groove with the upper end of said vertical portion terminating below the top of said piston head and with a vertical wear surface common to both portions adapted to slide against the cylinder wall; the improvement wherein: said horizontal portion includes an upper radially extending surface inclined from the horizontal and facing a correspondingly inclined groove surface and the rear face of said vertical portion tapers outward and upward to define with said offset peripheral portion of said piston head a triangular shaped thrust area in cross section for opening directly to the combustion area at the top of the vertical portion of said ring for insuring gas force application tending to seal said ring to said cylinder and said piston groove carrying said ring, while facilitating gas flow to the gap maintained between the inclined upper surface of said horizontal portion and said opposing groove surface by said applied gas force.

2. The piston head assembly as claimed in claim 1, wherein both the upper and lower surfaces of the horizontal portion of said ring are inclined inwardly toward each other and said opposed groove walls are correspondingly inclined outwardly.

3. The piston head assembly as claimed in claim 1, wherein the rear face of said vertical portion of said ring has a segment extending from said horizontal portion which is parallel to the wear surface to aid in introducing combustion gas to the groove receiving said ring.

* * * * *